United States Patent [19]
D'Amico

[11] Patent Number: 5,809,430
[45] Date of Patent: Sep. 15, 1998

[54] METHOD AND APPARATUS FOR BASE SELECTION IN A COMMUNICATION SYSTEM

[75] Inventor: Thomas V. D'Amico, Boca Raton, Fla.

[73] Assignee: Motorola, Inc., Schaumburg, Ill.

[21] Appl. No.: 801,034

[22] Filed: Feb. 19, 1997

Related U.S. Application Data

[63] Continuation of Ser. No. 254,047, Jun. 3, 1994, abandoned.

[51] Int. Cl.⁶ .................................................... H04Q 7/38
[52] U.S. Cl. ........................... 455/525; 455/436; 455/437
[58] Field of Search ................................. 455/33.1, 33.2, 455/33.4, 54.1, 68, 69, 70, 126, 127, 436, 437, 438, 441, 525, 443, 56.1; 379/60, 59; 370/331, 332

[56] References Cited

U.S. PATENT DOCUMENTS

| | | | |
|---|---|---|---|
| 4,670,906 | 6/1987 | Thro | 455/56.1 |
| 5,056,109 | 10/1991 | Gilhousen et al. | 455/69 |
| 5,257,408 | 10/1993 | Olson et al. | 455/67.6 |
| 5,265,119 | 11/1993 | Gilhousen et al. | 455/69 |
| 5,267,262 | 11/1993 | Wheatley, III | 455/69 |
| 5,278,992 | 1/1994 | Su et al. | 455/69 |
| 5,379,447 | 1/1995 | Bonta et al. | 455/33.2 |
| 5,513,246 | 4/1996 | Jonsson et al. | 379/60 |
| 5,530,917 | 6/1996 | Andersson et al. | 455/450 |
| 5,564,075 | 10/1996 | Gourgae | 455/69 |

*Primary Examiner*—Wellington Chin
*Assistant Examiner*—Lee Nguyen
*Attorney, Agent, or Firm*—John G. Rauch

[57] ABSTRACT

A personal communication system (100) having power control provided by a radio port control unit (122), provides for portable radio controlled optimum base station selection. Multiple base stations 102, 124, and 130 transmit channel signals including a code word which indicates the transmit power level of each transmission. A portable radio 120 measures the received signal strength (RSS) of each of the channel signals transmitted from the base stations and also receives the coded power levels of each transmission. The portable (120) then calculates an adjusted received signal strength (ARSS) value for different channels from different base stations. The portable (120) then compares the ARSS values to determine the optimum base station to communicate with for portable controlled handover, local registration, and link set up.

21 Claims, 2 Drawing Sheets

METHOD AND APPARATUS FOR BASE SELECTION IN A COMMUNICATION SYSTEM

This is a continuation of application Ser. No. 08/254,047, filed Jun. 3,1994 and now abandoned.

TECHNICAL FIELD

This invention relates generally to communication systems, and more specifically to optimum base station selection.

BACKGROUND

A personal communication system (PCS) provides wireless communication coverage over predetermined areas or cells. Generally, in order to establish communication in a PCS environment, a location registration is performed between a portable radio and a base station to identify the radio location within the system. Link set up to a telephone system is provided by establishing a communication link between the radio and the base station. Once a communication link through the telephone system is established, handover from one base station to another can occur as the radio is moved around by the user.

Typically, in order to perform location registration, link set up, or handover in a PCS environment, the received signal strength level (RSS) of a channel transmission from a base station is measured at the portable radio. Typically, the base sending the channel signal having the strongest RSS will be selected. However, using RSS alone may not be a good indicator of which is the best base to select in personal communication systems that use power control for the base stations. Power control allows base stations to transmit on different channel signals and at different power levels. One of the purposes of power control is to reduce interference to other base stations or portables. Power control allows the base to lower its power whenever possible, so if the portable and the base are very close then the base station will lower its power and the portable will do the same. By using RSS as the sole indicator of which base to select, the portable radio could end up registered to a base station transmitting at a high power level while another base station within the coverage area operating at a lower power level would be preferable. If all transmit power levels were equivalent in the system, the portable could then directly compare the RSS levels. But, since the power levels can vary in a power control system, another technique is needed to compensate for the different power levels. Hence, there is a need for a method to select an optimum base station within a personal communication system having power control.

DETAILED DESCRIPTION OF THE PREFERRED EMBODIMENT

Figure 1:
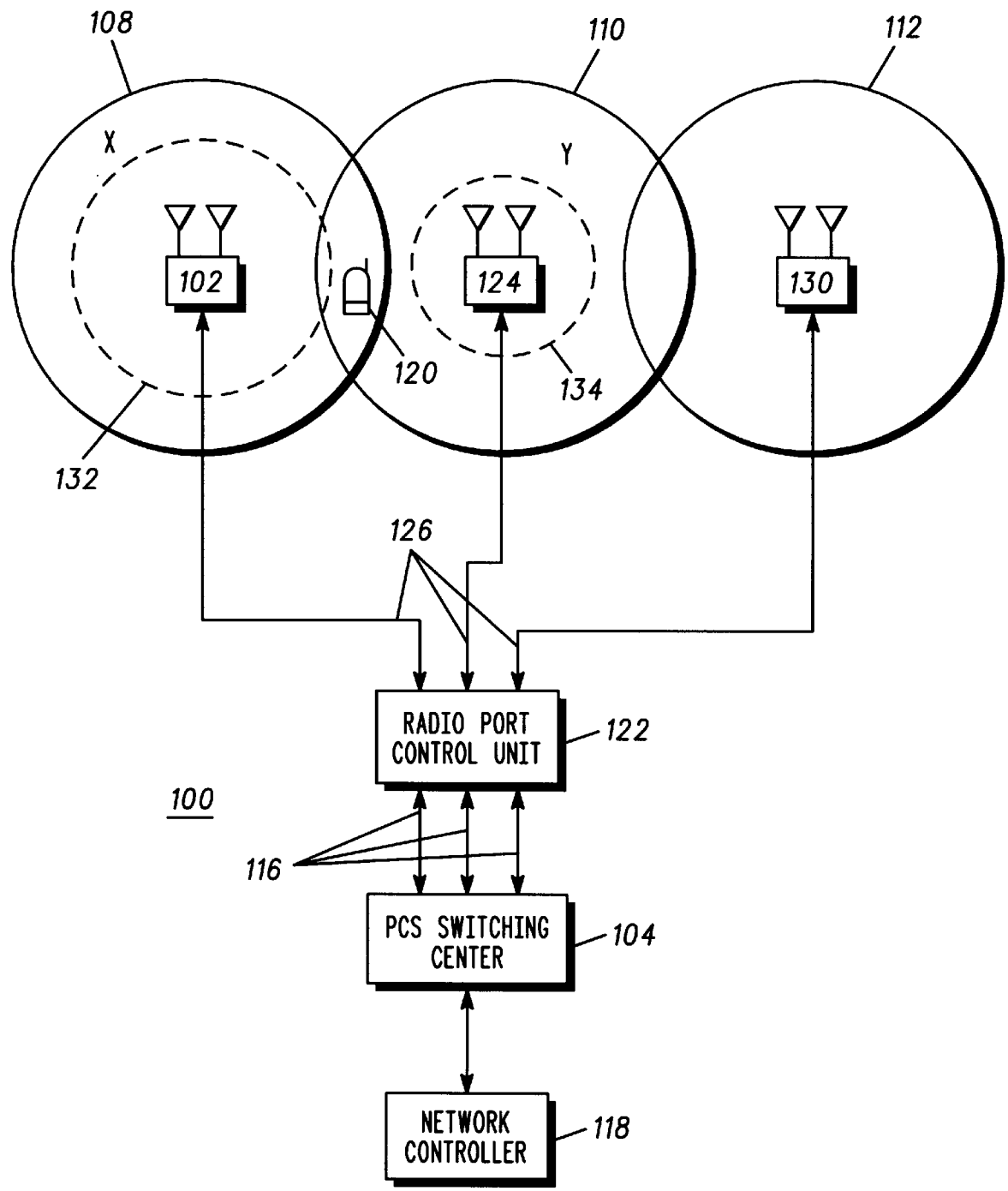
FIG. 1 is a diagram illustrating a communication system in accordance with the present invention.

Referring now to FIG. 1 of the accompanying drawings, an example of a personal communication system (PCS) 100 in accordance with the present invention is shown. System 100 comprises a plurality of fixed communication units (also know as radio ports, or base stations) 102, 124, and 130. The radio ports 102, 124, and 130 are coupled to a radio port control unit (RPCU) 122 through radio port interface lines 126 for transporting user communications and control functions between the radio ports and the radio port control unit. The radio port control unit 122 is responsible for base station control functions, such as power control. The radio ports 102, 124, and 130 provide wireless communication coverage within coverage areas 108, 110, and 112 respectively. The radio port control unit 122 is coupled to a PCS switching center 104, such as a public switched telephone network (PSTN) or a private branch exchange (PBX). The coupling between the RPCU 122 and the PCS switching center 104 is performed by telephone lines 116. The PCS switching center 104 is also coupled to a network controller 118 for providing system administration functions. While the radio port control unit 122 is shown external to the radio ports 102, 124, 130 in the preferred embodiment, the RPCU may also be included within the radio ports. By keeping the RPCU 122 external to the radio ports 102, 124, 130 the overall expense of controlling the radio ports is kept down by using a common controller. Radio ports 102, 124 and 130 allow persons using personal radio terminals (also known as handsets or portable radios) to access the PCS switching center 104. For example, access to the PCS switching center 104 can occur when a personal radio terminal 120 gets in communication range of a radio port 102 and after the personal radio terminal has established a communication link with the radio port 102. Radio ports 102, 124, and 130 use the power control provided by the radio port control unit 122 to establish the power levels with which to transmit multiple channel signals. The power control is responsible for lowering the power level of a transmitted signal to a handset as the handset is moved closer to the radio port and increasing the transmitted power level as the handset is moved farther away from the radio port.

The personal communication system 100 just described provides a means for the handset 120 to select an optimum radio port (or base station) for registration, link set up, and handover based on the RSS and the transmit power level for each channel transmission from base stations that provide coverage areas within which the handset is located. If a base station transmits at various power levels the portable decides which is the best base to communicate with, based on the lowest propagation loss between handset and the base station.

As an illustrating example of the invention, refer again to FIG. 1 and specifically to the configuration of the two overlapping cells 108 and 110 for base stations 102 and 124. Each base station 102, 124 is transmitting on only one channel and each transmits a power level indicator, such as a code word, on its channel which corresponds to the channel power level. Base station 102 transmits at power level X and base station 124 transmits at power level Y. Transmit power levels X and Y are represented in FIG. 1 by designators 132 and 134 respectively. The portable 120 monitors both base stations 102 and 124 for the purpose of determining the potentially strongest base station for location registration. The portable 120 receives the channel transmission from base station 102 and measures the receive signal strength (RSS) as level A. The portable 120 also receives the channel transmission from base station 124 and measures the RSS as level B. Next, the portable 120 normalizes the signal strength by calculating an adjusted receive signal strength (ARSS) for each channel transmission received at the portable, this ARSS is determined by subtracting the power level from the RSS value for each received channel signal. The adjusted receive signal strength for the example of FIG. 1 is denoted by the following formulas:

$$A'=A-X$$

$$B'=B-Y,$$

where A' represents the ARSS for base station 102, and B' represents the ARSS for base station 124.

The portable 120 compares the ARSS values A' and B' to determine which base station, 102 or 124, is the strongest, just as if both were transmitting at equal power levels. Therefore, the portable 120 is able to properly control its location registration procedures by compensating for the transmit power level differences.

Since the ARSS of a signal is a function of the propagation loss between the handset and the base, and given the propagation loss to base 124 is lower than to base 102, the portable would want to register with base 124, while if the portable only took into account the RSS, as done in the prior art approach, it would erroneously conclude that base station 102 was the strongest base. For example, if for base station 102 the transmit power level X was 100 dBm (where 0 dBm is equivalent to 1 milliwatt into a 50 ohm load) and the RSS A was 20 dBm, and for base station 124 the transmit power level Y was 80 dBm while RSS B was 10 dBm, the portable 120 would calculate A'=−80 dB for base station 102 and B'=−70 dB for base station 124. The portable 120 would then register with base station 124 due to the stronger ARSS. Thus, the portable does not necessarily register to the base station with the strongest transmit power level or the strongest RSS. If all the transmit power levels were equal, the portable 120 could directly compare A and B (the RSS values). However, since the power levels are not equal, the method as described by the invention allows the portable 120 to normalize the receive signal strength and select the base station with the strongest ARSS. In this case A' and B' are relative ARSS values. Alternatively, X and Y may represent a relative power level in dB which would then produce an ARSS value in dBm, the ARSS results are still compared to each other. By comparing the adjusted received signal strength from each transmission channel an optimal base station can be chosen for the handset.

While still referring to FIG. 1, another embodiment of the invention can be described where the handset 120 has already established a communication link with base station 102. The handset monitors the surrounding base stations within the coverage areas 108 and 110 as previously described, and if the ARSS for base station 124 exceeds the ARSS for base station 102, the handset 120 will perform a handoff function where the communication link is transferred to base station 124 via the radio port control unit 122. The same technique is utilized for communication link set up where a communication link is to be established by the portable. The portable monitors the surrounding base stations and calculates an ARSS for each channel transmission having a code word. The portable then selects the base station with the highest associated ARSS. When a communication link is established, this invention provides handover, and when a handset is in idle or scan mode, this invention will provide registration. The method for optimum base selection as described by the invention, allows a portable to make decisions about the best base with which to register, handoff, or set up a link.

While the above examples describe two base stations each transmitting on a single channel, the method as described by the invention can also apply to communication systems having multiple base stations each having multiple communication channels, where each channel may use a different power level. One or more handsets can monitor any of the base stations that send out channel transmissions as long as the base stations have coverage areas within which the handsets are located. The method as described by the invention also applies to a single base station transmitting on at least one channel as well as on multiple channels. If only one transmission channel having a code word were transmitted from a single base, the handset would select that single base. When transmitting on multiple channels the base may selectively assign code words to the transmit signals, however only the signals having code words will be used to determine the strongest ARSS.

Figure 2:
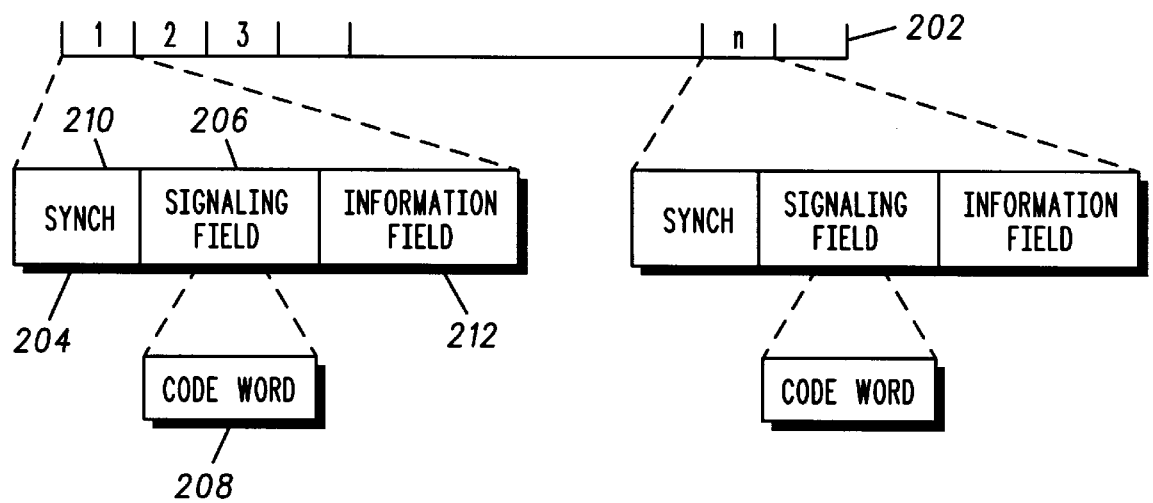
FIG. 2 is a signaling diagram in accordance with the present invention.

The actual transmission of the transmit power level information from the base to the handset can be accomplished by assigning a power level indicator, preferably a code word, to represent the power level at the base. FIG. 2 of the accompanying drawings shows the preferred embodiment for transmission of the code word 208. An RF (radio frequency) carrier 202 consists of time slots (or transmit channel signals) 204. Each time slot 204 includes synchronization data (SYNCH) 210, an imbedded signaling field 206, and an information field 212. Data such as paging, identification, and other information are included into the signaling field 206. The code word 208, representing the transmit power level of the channel transmission, is also contained within the imbedded signaling field 206. The code word 208, representing the transmit power level, is periodically transmitted within the imbedded signaling 206 for each channel transmission. By transmitting the code word 208 within the imbedded signaling 206, the handset determines the transmit power level by decoding the code word once the channel transmission is received. The RSS for each received channel signal is then measured, and the ARSS calculation is performed with the respective RSS and transmit power level for each channel transmission received at the handset.

Figure 3:
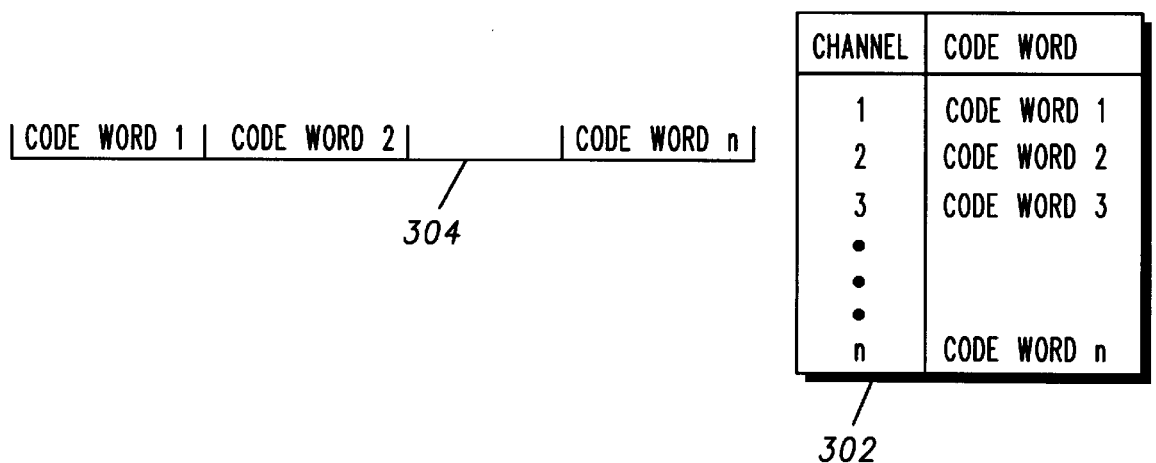
FIG. 3 is a signaling diagram in accordance with the present invention.

Alternatively, the code for each channel may be broadcast on a common signaling channel as depicted in FIG. 3, where each channel transmission has an associated code word 302; common signaling channels 304 are used in such systems as analog cellular systems.

The method for portable controlled optimum base selection, as described by the invention, applies to handset location registration, link set up, and handover in a PCS environment having power control. The transmission of the code words representing transmit power levels can be accomplished by the use of imbedded signaling channels or a common signaling channel from at least one base station. The transmission of codes representing the power levels of each channel transmission and the calculation of an ARSS by the portable, provide an improved method with which to make decisions for location registration, portable controlled handover, and link set up. By comparing the adjusted received signal strength from each transmission channel an optimum base station can be chosen for the handset and the method as described by the invention allows the handset to make the decision about which base to select.

Portable controlled optimum base selection, as described by the invention, may be used in wireless communication systems using power control, such as certain digital cordless or personal communication systems, where portables measure RSS to determine optimum base station selection.

What is claimed is:

1. A method for selecting an optimal base station from a handset in a communication system which includes first and second base stations having first and second communication channels respectively, comprising the steps of:

at the first and second base stations, assigning a code word to each of the first and second communication channels, the code word corresponding to a transmit power level for the first and second communication channels, respectively, the transmit power levels being selected from a plurality of power levels;

transmitting first and second signals from the first and second base stations respectively, the first signal including the code word for the first communication channel and the second signal including the code word for the second communication channel;

measuring at the handset the received signal strength (RSS) for each of the first and second signals;

at the handset, determining the transmit power level for each of the first and second base stations based on their respective code word;

at the handset, adjusting said RSS for each of the first and second signals based on the transmit power level for each of the first and second base stations respectively; and at the handset, selecting the optimum base station for communication with said handset based on the adjusted RSS for each of said first and second signals.

2. A method as described in claim 1, wherein the step of adjusting includes the step of subtracting the transmit power level from the RSS for each of the first and second signals respectively.

3. A method as described in claim 2, wherein the step of selecting includes the step of selecting a base station with the strongest adjusted RSS.

4. A method as described in claim 1, wherein the step of transmitting includes the step of broadcasting a common signaling channel from each of said first and second base stations, wherein each common signaling channel includes the respective code word.

5. A method as described in claim 1, wherein the step of transmitting includes the step of transmitting from each of said first and second base stations an imbedded signaling channel including the respective code word.

6. A method for selecting an optimum base station from a handset in a communication system which includes multiple base stations having transmit channels, comprising the steps of:

determining a transmit power level for the transmit channels at the multiple base stations;

selectively assigning code words to the transmit channels at the multiple base stations, the code words corresponding to the determined transmit power level;

transmitting transmit signals at the determined transmit power level from the multiple base stations, wherein at least one of the transmit signals includes the code words;

receiving at the handset the transmit signals including the code words;

measuring at the handset the received signal strength (RSS) of the transmit signals having code words;

at the handset determining a transmit power level for each the transmit signals having code words in response to the received code words;

at the handset, adjusting said RSS for each of the transmit signals having code words, based on the transmit power level; and at the handset, selecting the optimum base station for communication with said handset based on the adjusted RSS.

7. A method as described in claim 6, wherein the step of adjusting includes the step of subtracting the transmit power level from the RSS.

8. A method as described in claim 6, wherein the step of selecting includes the step of selecting a base station with the strongest adjusted RSS.

9. A method as described in claim 6, wherein the step of transmitting includes the step of broadcasting from each of the multiple base stations a common signaling channel including said selectively assigned code words for the transmit channels.

10. A method as described in claim 6, wherein the step of transmitting includes the step of transmitting from each of the multiple base stations at least one imbedded signaling channel including said selectively assigned code words for the transmit channels.

11. In a communication system including multiple base stations using power control and a portable radio, the portable radio utilizing a method for selecting a base station, the method comprising the steps of:

at each of the multiple base stations, determining a transmit power level for transmission of signals from each of the multiple base stations;

assigning a code word as a power level indicator indicative of the respective determined transmit power level for channel signals to be transmitted from each of the multiple base stations;

broadcasting channel signals from each of the multiple base stations, including transmitting the code words within each of the channel signals as the power level indicator;

receiving the channel signals, including the power level indicator, at the portable radio;

decoding the code word at the portable radio;

at the portable radio, determining the transmit power level of each of the received channel signals based on their respective code word;

at the portable radio, determining the received signal strength (RSS) for each of the received channel signals;

at the portable radio, determining an adjusted RSS for each of the received channel signals by subtracting the transmit power level from the RSS;

at the portable radio, comparing the adjusted RSS from all the received channel signals; and at the portable radio, selecting the base station with the strongest adjusted RSS.

12. In a communication system including a first base station having power control and a second base station having power control, a method for establishing communication with a radio that chooses between the first base station and the second base station, the method comprising the steps of:

at the first base station and the second base station, establishing a power level for each of the channel signals;

broadcasting the channel signals from the first and second base stations at the respective established power levels;

receiving at the radio, the channel signals from the first and second base stations;

at the radio, measuring the received signal strength (RSS) for each of the channel signals;

at the radio, determining the established power level for each of the channel signals;

at the radio, calculating an adjusted RSS (ARSS) value for each of the channel signals based on the established power level and the RSS; and at the radio, selecting the second base station when the ARSS value for a channel signal received from the second base station exceeds each ARSS value for channel signals received from the first base station.

13. A method as described in claim 12, wherein the step of broadcasting further comprises the step of transmitting a code word within each of the channel signals, the code word representing the established power level for each of the channel signals.

14. A method as described in claim 13, wherein the step of determining further comprises the step of decoding at the radio the code word for each of the channel signals to determine the established power level.

15. A method as described in claim 12, wherein the step of calculating further comprises the step of subtracting the established power level from the RSS for each of the channel signals.

16. A method for a portable radio to select an optimal base station from multiple base stations, comprising the steps of:
   from the multiple stations,
      selecting a transmit power level from a plurality of transmit power levels;
      broadcasting at least one channel signal;
      assigning a code word to represent the selected power level of each of the at least one channel signal;
      transmitting a common signaling channel including each code word;
   and at the portable radio,
      receiving the common signaling channel;
      measuring the received signal strength (RSS) for each of said at least one channel signal;
      decoding each code word from the common signaling channel to determine the selected transmit power level for each of said at least one channel signal;
   calculating an adjusted RSS by subtracting the RSS from the selected transmit power level for each of said at least one channel signal;
   comparing the adjusted RSS for each of said at least one channel signal; and
      selecting the optimal base station based on the strongest adjusted RSS and selected transmit power level for each of said at least one channel signal.

17. A method as described in claim 16, further comprising the step of registering to the selected optimal base station from the portable radio.

18. A method as described in claim 16, further comprising the step of setting up a link from the portable radio to the selected optimal base station.

19. A method as described in claim 16, further comprising the step of the portable radio performing handover to the selected optimal base station.

20. A method for a portable to choose an optimum base station from a plurality of base stations, each of the base stations having multiple communication channels, comprising the steps of:
   at the plurality of base stations,
      selecting a transmit power level for each of the base station's multiple communication channels;
      broadcasting a signal for each of the base station's multiple communication channels, the signal having the selected transmit power level, the selected transmit power level being represented by a code word, the code word being imbedded within the signal for each of the multiple communication channels;
   and at the portable,
      measuring the received signal strength (RSS) for each of the signals;
      decoding the code word to determine the selected transmit power level for each of the multiple communication channels;
   calculating an adjusted RSS by subtracting the selected transmit power level from the RSS for each of the multiple communication channels;
   comparing the adjusted RSS for each of the multiple communication channels; and
      selecting the optimum base station based on the strongest adjusted RSS and power level for each of the multiple communication channels.

21. A method for selecting an optimum base station in a communication system which includes multiple base stations and a plurality of mobile stations, each base station being configured for communication using transmit channels and determining a transmit power level for each of the transmit channels, each base station selectively assigning code words to the transmit channels, the code words corresponding to the determined transmit power level, each base station transmitting transmit signals at the determined transmit power level, at least one of the transmit signals including the code words, wherein the improvement comprises:
   at a mobile station,
      measuring the received signal strength (RSS) of the transmit signals including code words;
      producing an adjusted RSS (ARSS) for each of the transmit signals having code words by subtracting the power level from the RSS; and
      selecting the optimum base station for communication with the mobile station based on the ARSS.

* * * * *